US007565460B2

(12) United States Patent
Morinaga

(10) Patent No.: US 7,565,460 B2
(45) Date of Patent: Jul. 21, 2009

(54) INFORMATION PROCESSING APPARATUS AND METHOD FOR HANDLING PACKET STREAMS

(75) Inventor: Takeo Morinaga, Kanagawa (JP)

(73) Assignee: Sony Corporation (JP)

( * ) Notice: Subject to any disclaimer, the term of this patent is extended or adjusted under 35 U.S.C. 154(b) by 1097 days.

(21) Appl. No.: 09/913,688

(22) PCT Filed: Dec. 15, 2000

(86) PCT No.: PCT/JP00/08892

§ 371 (c)(1),
(2), (4) Date: Nov. 14, 2001

(87) PCT Pub. No.: WO01/44957

PCT Pub. Date: Jun. 21, 2001

(65) Prior Publication Data
US 2002/0161942 A1 Oct. 31, 2002

(30) Foreign Application Priority Data
Dec. 17, 1999 (JP) ............................ 11/358634

(51) Int. Cl.
G06F 13/28 (2006.01)
G06F 3/00 (2006.01)
G06F 12/00 (2006.01)
G06F 13/00 (2006.01)
G06F 13/12 (2006.01)

(52) U.S. Cl. .................. 710/22; 710/3; 710/4; 710/23; 710/25; 710/26; 710/52; 710/57; 710/62; 710/64; 710/72; 710/74; 711/1; 711/100; 711/111; 711/112; 711/200; 711/202

(58) Field of Classification Search ............. 710/22–26, 710/28, 3, 4, 52, 53, 57, 62–64, 72–74, 29; 711/1, 4, 100, 111, 112, 200, 202
See application file for complete search history.

(56) References Cited

U.S. PATENT DOCUMENTS

| 5,253,356 | A | * | 10/1993 | Yamadate et al. ............. 710/22 |
| 5,602,994 | A | | 2/1997 | Ferron |
| 5,870,628 | A | * | 2/1999 | Chen et al. .................... 710/22 |
| 5,881,248 | A | * | 3/1999 | Mergard ...................... 710/100 |
| 6,401,149 | B1 | * | 6/2002 | Dennin et al. ................. 710/58 |
| 6,453,115 | B1 | | 9/2002 | Boyle |

(Continued)

FOREIGN PATENT DOCUMENTS

EP 0 275 157 A2 * 7/1988

(Continued)

Primary Examiner—Tanh Q Nguyen
(74) Attorney, Agent, or Firm—Lerner, David, Littenberg, Krumholz & Mentlik, LLP

(57) ABSTRACT

A control machine which uses a data amount stored in an FIFO as a trigger and allows a DMA transfer to be started according to a capacity of the FIFO allows a control machine for preparing for the DMA transfer to start to prepare a command and the like for the DMA transfer. The control machine for preparing for the DMA transfer issues the prepared command to a control machine for transferring DMA data, so that a process according to the command is started. At the time of the DMA transfer, a burden on a host CPU is reduced.

10 Claims, 13 Drawing Sheets

U.S. PATENT DOCUMENTS 7,076,150 B2 7/2006 Morinaga et al.
2001/0036269 A1 11/2001 Morinaga et al.

FOREIGN PATENT DOCUMENTS

| JP | 1-163864 | 6/1989 |
| JP | 7-114510 | 5/1995 |
| JP | 10-11092 | 1/1998 |

* cited by examiner

Fig. 12A

| ADDRESS (NOTES 1) | | | REGISTER | |
|---|---|---|---|---|
| CS1- | CS0- | DA2 | DA1 | DA0 | WRITE | READ |
| CONTROL BLOCK REGISTER | | | | | | |
| L | H | H | H | L | DEVICE·CONTROL | SUBSTITUTE STATUS |
| L | H | H | H | H | NOT USED | DRIVE ADDRESS |
| COMMAND BLOCK REGISTER | | | | | | |
| H | L | L | L | L | DATA | |
| H | L | L | L | H | FEATURE | ERROR |
| H | L | L | H | L | SECTOR·COUNT | |
| H | L | L | H | H | SECTOR·NO. | |
| H | L | H | L | L | CYLINDER·LOW | |
| H | L | H | L | H | CYLINDER·HIGH | |
| H | L | H | H | L | DEVICE / HEAD | |
| H | L | H | H | H | COMMAND | STATUS |

NOTES 1: BECAUSE CS0- AND CS1 DENOTE NEGATIVE LOGICS    L = ASSERT, H = NEGATE

RSRV: RESERVATION    SRST: SOFTWARE·RESET
nIEN: INTERRUPTION PERMISSION (NEGATIVE LOGIC)

Fig. 12B

| b7 | b6 | b5 | b4 | b3 | b2 | b1 | b0 |
|---|---|---|---|---|---|---|---|
| RSRV | RSRV | RSRV | RSRV | RSRV | SRST | nIEN | 0 |

Fig. 12C

| b15 | b14 | b13 | b12 | b11 | b10 | b9 | b8 |
|---|---|---|---|---|---|---|---|
| DATA·BYTE 1 (UPON 16-BIT·ACCESS) | | | | | | | |
| NOT USED (UPON 8-BIT ACCESS) | | | | | | | |

| b7 | b6 | b5 | b4 | b3 | b2 | b1 | b0 |
|---|---|---|---|---|---|---|---|
| DATA·BYTE 0 (UPON 16-BIT·ACCESS) | | | | | | | |
| DATA·BYTE (UPON 8-BIT ACCESS) | | | | | | | |

Fig. 12D

| b7 | b6 | b5 | b4 | b3 | b2 | b1 | b0 |
|---|---|---|---|---|---|---|---|
| SECTOR NO. (CHS MODE) | | | | | | | |
| LBA BIT (LBA MODE) | | | | | | | |

Fig. 13A

| b7 | b6 | b5 | b4 | b3 | b2 | b1 | b0 |
|----|----|----|----|----|----|----|----|
| CYLINDER·HIGH·REGISTER | | | | CYLINDER·LOW·REGISTER | | | |

CYLINDER NO. (CHS MODE)
LBA BIT (LBA MODE)

Fig. 13B

| b7 | b6 | b5 | b4 | b3 | b2 | b1 | b0 |
|----|----|----|----|----|----|----|----|
| RSRV | L | RSRV | DEV | HEAD NO. (CHS MODE) / LBA BIT (LBA MODE) | | | |

RSRV : RESERVATION
L : LBA MODE SELECTION
DBA : DEVICE ADDRESS

Fig. 13C

| b7 | b6 | b5 | b4 | b3 | b2 | b1 | b0 |
|----|----|----|----|----|----|----|----|
| THE NUMBER OF SECTORS | | | | | | | |

Fig. 13D

| b7 | b6 | b5 | b4 | b3 | b2 | b1 | b0 |
|----|----|----|----|----|----|----|----|
| BSY | DRDY | DF | DSC | DRQ | CORR | IDX | ERR |

BSY : BUSY (ACCESS INHIBITION)
DRDY : DEVICE·READY
DF : DEVICE·FAULT
DSC : DEVICE·SEEK·ERROR
DRQ : DATA REQUEST
CORR : DATA CORRECTED
IDX : INDEX DETECTION
ERR : ERROR GENERATION

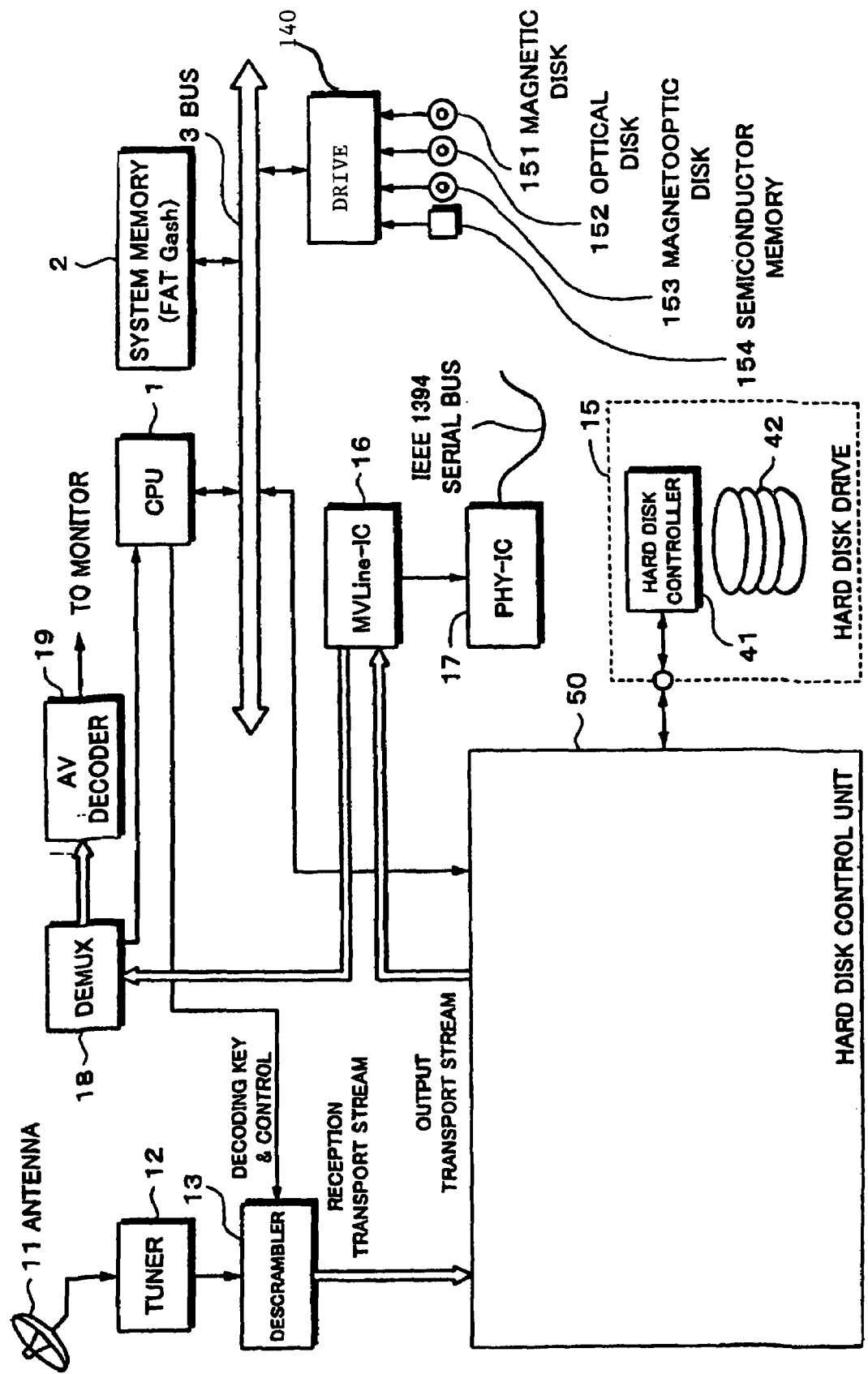

INFORMATION PROCESSING APPARATUS AND METHOD FOR HANDLING PACKET STREAMS

CROSS-REFERENCE TO RELATED APPLICATIONS

The present application is a national phase entry under 35 U.S.C. § of International Application No. PCT/JP00/08892 filed Dec. 15, 2000, published in Japanese, which claims priority from Japanese Application No. JP-358634 filed Dec. 17, 1999.

TECHNICAL FIELD

The invention relates to information processing apparatus and method and a recording medium and, more particularly, to information processing apparatus and method and a recording medium which are suitable for reducing a burden of a host CPU when a DMA transfer is performed.

BACKGROUND ART

In recent years, digital broadcast has been started in earnest and various digital broadcast receiving apparatuses have been put into practical use. Among those apparatuses, there is an apparatus having therein a storage device such as a hard disk or the like for recording the received digital broadcast program. FIG. 1 shows an example of a construction of a conventional apparatus such that a hard disk drive 15 serving as a storage device is built in a digital broadcast receiving apparatus for receiving digital broadcast.

The digital broadcast receiving apparatus receives a transport stream as a digital broadcast program from a broadcast station (not shown) and can perform a display or the like of an image and sound as a transport stream. Further, after the transport stream was recorded, the apparatus can also reproduce the recorded transport stream.

That is, a digital broadcast wave is received by an antenna 11 and the reception signal is outputted to a tuner 12. The tuner 12 performs a demodulation or the like of the reception signal from the antenna 11, obtains the transport stream, and supplies it to a descrambler 13. Under a control of a CPU 1, the descrambler 13 descrambles the scramble performed to the transport stream from the tuner 12 by using a decoding key that is supplied from the CPU 1 and outputs the descrambled transport stream to a hard disk control unit 14.

The transport stream (hereinafter, properly referred to as a reception transport stream) which is outputted from the descrambler 13 is supplied to a PID (Packet Identification) parser 21 and a switch 31 in the hard disk control unit 14. Besides the reception transport stream, a transport stream which is reproduced from the hard disk drive 15 is also supplied to the switch 31 through a transmitter 26.

In case of reproducing the reception transport stream, the switch 31 selects the reception transport stream from the two transport streams (reception transport stream and transport stream which is supplied from the transmitter 26) which are inputted to the switch 31 and outputs it as an output transport stream to an MVLink-IC (MPEG (Moving Picture Experts Group) Link Integrated Circuit)) 16.

The MVLink-IC 16 performs a process or the like of a link layer in a layer structure of an IEEE (Institute of Electrical and Electronics Engineers) 1394 serial bus to the output transport stream and outputs the resultant transport stream to a PHY-IC 17, or the MVLink-IC 16 sends the output transport stream to a DEMUX (demultiplexer) 18.

The PHY-IC 17 executes the process of the link layer in the layer structure of the IEEE1394 serial bus. When the output transport stream is received from the MVLink-IC 16, the PHY-IC 17 isochronously transfers the output transport stream to an IEEE1394 apparatus (not shown) through the IEEE1394 serial bus.

The DEMUX 18 has a microcomputer, a memory, and the like (not shown). The DEMUX 18 separates a TS packet in which data (PAT (Program Association Table) or PMT (Program Map Table)), the decoding key for descrambling the scramble of the transport stream, and control data which is used for the other control of a section have been arranged from a transport packet (hereinafter, properly referred to as a TS packet) constructing the output transport stream from the MVLink-IC 16, further, analyzes the contents of the TS packet, and outputs necessary control data to the CPU 1.

As mentioned above, the CPU 1 outputs the decoding key in the data of the section supplied from the DEMUX 18 to the descrambler 13 and controls the descrambler 13 on the basis of data of another section which is likewise supplied from the DEMUX 18.

In addition to the separation of the TS packet in which the control data (data of the section) has been arranged from the output transport stream, the DEMUX 18 separates a packet in which video data and audio data (hereinafter, both of them are properly collectively referred to as AV data) of a program selected by the user by operating a remote commander or the like (not shown) have been arranged and outputs the packet to an AV decoder 19. The AV decoder 19 MPEG2-decodes the TS packet from the DEMUX 18 and outputs the resultant AV data to a monitor (not shown). Thus, an image and an audio sound as a digital satellite broadcast program are outputted (displayed) by the monitor.

In case of recording the reception transport stream, the switch 31 selects likewise the reception transport stream from the two transport streams (the reception transport stream and the transport stream supplied from the transmitter 26) which are inputted to the switch 31 and outputs it as an output transport stream to the DEMUX 18 via the MVLink-IC 16.

As mentioned above, the DEMUX 18 separates the TS packet in which the control data has been arranged from the output transport stream, separates the necessary control data arranged in the TS packet, and outputs it to the CPU 1. The CPU 1 controls the descrambler 13 on the basis of the control data. Thus, the descrambling of the transport stream including the TS packet serving as a recording target at present is executed in the descrambler 13.

As mentioned above, the reception transport stream is also supplied to the PID parser 21. The PID parser 21 refers to a PID of the TS packets constructing the reception transport stream supplied to the parser 21 and supplies only the TS packets regarding the program as a recording target to a receiver 22 (the remaining TS packets are abandoned). The receiver 22 adds a time stamp based on a clock which is generated from a cycle timer 27 to the TS packets from the PID parser 21 and supplies the resultant TS packets to an input FIFO (First In First Out) 23. That is, the cycle timer 27 outputs the clock of a predetermined frequency to the receiver 22 and transmitter 26. The receiver 22 adds the time stamp synchronized with the clock which is outputted from the cycle timer 27 to the TS packets from the PID parser 21 and outputs the resultant TS packet to the input FIFO 23. The input FIFO 23 sequentially stores the TS packets from the receiver 22 and outputs the stored TS packets to a hard disk I/F (interface) 24 in the storing order in accordance with a control of a controller 28.

The controller 28 has a microcomputer therein, monitors a status of storage in the input FIFO 23 or an output FIFO 25, and controls the reading and writing operations of data in each FIFO. The controller 28 also controls the hard disk I/F 24.

When the TS packets are received from the input FIFO 23, the hard disk I/F 24 outputs the TS packets to the hard disk drive 15. In the hard disk drive 15, the TS packets from the hard disk I/F 24 are received by a hard disk controller 41 and recorded onto a hard disk 42.

Subsequently, in case of reproducing the TS packets recorded on the hard disk 42 as mentioned above, the transport stream (hereinafter, properly referred to as a reproduction transport stream) as a sequence of the TS packets recorded on the hard disk 42 is read out and outputted to the hard disk control unit 14 by the hard disk controller 41.

In the hard disk control unit 14, the reproduction transport stream is received and supplied to the output FIFO 25 by the hard disk I/F 24. The output FIFO 25 sequentially stores the TS packets constructing the reproduction transport stream from the hard disk I/F 24 and outputs the stored TS packets to the transmitter 26 in the storing order in accordance with the control of the controller 28.

The transmitter 26 outputs the reproduction transport stream as a sequence of the TS packets from the output FIFO 25 to the switch 31 synchronously with the clocks supplied from the cycle timer 27. That is, in the case where the transport stream as a sequence of the TS packets which are outputted by the PID parser 21 is recorded to the hard disk drive 15, there is a case where time intervals of the TS packets constructing the transport stream are lost. Therefore, the transmitter 26 refers to the time stamps added to the TS packets by the receiver 22 and outputs the TS packets to the switch 31 at timing such that the time intervals of the TS packets are returned to the original state.

In case of reproducing the TS packets recorded on the hard disk 42, the switch 31 selects the reproduction transport stream which is outputted from the transmitter 26 and outputs it as an output transport stream to the MVLink-IC 16. In a manner similar to the case of processing the reception transport stream, hereinafter, the reproduction transport stream as an output transport stream is isochronously transferred on the IEEE1394 serial bus through the PHY-IC 17 or outputted to the monitor through the DEMUX 18 and decoder 19.

The CPU 1 is connected to a bus 3 and reads out and executes a program stored in a system memory 2 likewise connected to the bus 3, thereby executing the control of the descrambler 13 and various other processes. The program for allowing the CPU 1 to execute the various processes has been stored in the system memory 2.

A host I/F 29 constructing the hard disk control unit 14 functions as an interface for communicating with the CPU 1 through the bus 3. An input/output buffer 30 provided between the host I/F 29 and the foregoing hard disk I/F 24 temporarily stores the data which is transmitted and received therebetween.

Consequently, the CPU 1 can access to the hard disk drive 15 through the bus 3, host I/F 29, I/O buffer 30, and hard disk I/F 24. Therefore, the CPU 1 can record the data as a file onto the hard disk drive 15 and read out the data as a file recorded on the hard disk drive 15.

The minimum unit of the recording of the data on the hard disk drive 15 is called a sector. One sector consists of, for example, 512 bytes. Further, specifications of an interface and a using method of the hard disk drive 15 have been unified in a manner such that when it accesses to the data, an accessing location on the hard disk drive 15 is designated by a sector address as a minimum recording unit. The hard disk drive 15 has a construction such that when it is accessed to the data, unless the accessing location is designated by the sector address, it is not accepted as a command.

The address of the minimum unit is expressed by a logical serial number called LBA (Logical Block Address). As commands to access to the hard disk drive 15, there are a DMA (Direct Memory Access) in which the data transfer is controlled by a DMA controller and a PIO (Programmed I/O) in which the data transfer is controlled by the CPU. In both cases, it is necessary to use the LBA for address designation.

In the foregoing conventional digital video broadcast receiving apparatus, in the case where an AV (Audio Visual) stream such as a transport stream is recorded onto the built-in hard disk or read out and reproduced from the hard disk by the DMA, it is necessary that a host CPU (Central Processing Unit) executes the issuance of a command to the hard disk, the setting of the LBA at every block transfer, the setting of transfer start timing, and the like. There is a problem such that those processes become a burden on the host CPU and high performance cannot be effected.

Therefore, there is a problem such that there is a possibility that, for example, while the recording process of the AV stream is being executed, the stream cannot be continuously recorded.

DISCLOSURE OF INVENTION

The invention is made in consideration of such a situation and it is an object of the invention that by providing a register for DMA transfer and a function which can automatically set an LBA, the issuance of a command, the setting of the LBA, and the setting of transfer start timing which have conventionally been processed by a host CPU are executed on a DMA side and a burden on the host CPU as mentioned above is reduced.

According to the invention, to solve the above problems, there is provided an information processing apparatus comprising: receiving means for receiving a stream constructed by packets of a predetermined format; extracting means for extracting the packets which are recorded to a recording apparatus from the packets constructing the stream received by the receiving means; memory means for storing the packets extracted by the extracting means; a command buffer for forming a command for instructing a DMA transfer; and transfer means for DMA-transferring the packets to the recording apparatus by using the packets as a block of a predetermined data amount in accordance with the command formed in the command buffer.

According to the invention, there is provided an information processing apparatus comprising: receiving means for receiving a stream constructed by packets of a predetermined format; extracting means for extracting the packets which are recorded to a recording apparatus from the packets constructing the stream received by the receiving means; memory means for storing the packets extracted by the extracting means; a command buffer for setting address information for DMA transfer: and adding means for adding the set address information every predetermined data amount (block) of the packets read out from the memory means.

According to the invention, there is provided a digital broadcast receiving apparatus having a hard disk drive therein, comprising: receiving means for receiving a stream constructed by packets of a predetermined format; extracting means for extracting the packets which are recorded into the hard disk drive from the packets constructing the stream received by the receiving means; memory means for storing the packets extracted by the extracting means; a command buffer for forming a command for instructing a DMA transfer; and transfer means for DMA-transferring the packets to the hard disk drive by using the packets as a block of a predetermined data amount in accordance with the command formed in the command buffer.

According to the invention, there is provided a digital broadcast receiving apparatus having a hard disk drive therein, comprising: receiving means for receiving a stream constructed by packets of a predetermined format; extracting means for extracting the packets which are recorded into the hard disk drive from the packets constructing the stream received by the receiving means; memory means for storing the packets extracted by the extracting means; a command buffer for setting address information for DMA transfer; and adding means for adding the set address information every predetermined data amount (block) of the packets read out from the memory means.

According to the invention, there is provided an information processing method comprising: a receiving step of receiving a stream constructed by packets of a predetermined format; an extracting step of extracting the packets which are recorded to a recording apparatus from the packets constructing the stream received by the receiving step; a storing step of storing the packets extracted by the extracting means; a forming step of forming a command for instructing a DMA transfer by a command buffer; and a transfer step of DMA-transferring the packets to the recording apparatus by using the packets as a block of a predetermined data amount in accordance with the command formed in the forming step.

According to the invention, there is provided an information processing method comprising: a receiving step of receiving a stream constructed by packets of a predetermined format; an extracting step of extracting the packets which are recorded to a recording apparatus from the packets constructing the stream received by the receiving step; a storing step of storing the packets extracted by the extracting step; a setting step of setting address information for DMA transfer by a command buffer; and an adding step of adding the set address information every predetermined data amount (block) of the packets read out from the memory means.

According to the invention, there is provided a recording medium in which a computer-readable program has been recorded, wherein the program comprises: a receiving step of receiving a stream constructed by packets of a predetermined format; an extracting step of extracting the packets which are recorded to a recording apparatus from the packets constructing the stream received by the receiving step; a storing step of storing the packets extracted by the extracting means; a forming step of forming a command for instructing a DMA transfer by a command buffer; and a transfer step of DMA-transferring the packets to the recording apparatus by using the packets as a block of a predetermined data amount in accordance with the command formed in the forming step.

According to the invention, there is provided a recording medium in which a computer-readable program has been recorded, wherein the program comprises: a receiving step of receiving a stream constructed by packets of a predetermined format; an extracting step of extracting the packets which are recorded to a recording apparatus from the packets constructing the stream received by the receiving step; a storing step of storing the packets extracted by the extracting step; a setting step of setting address information for DMA transfer by a command buffer; and an adding step of adding the set address information every predetermined data amount (block) of the packets read out from the memory means.

As mentioned above, according to the invention, the stream constructed by the packets of the predetermined format is received, the packets which were extracted from the packets constructing the received stream and are recorded to the recording apparatus are stored, and the packets are DMA transferred to the recording apparatus in accordance with the command which was formed in the command buffer and instructs the DMA transfer by using the packets as a block of the predetermined data amount. Thus, a burden on a host CPU is reduced.

According to the invention, the stream constructed by the packets of the predetermined format is received, the packets which were extracted from the packets constructing the received stream and are recorded to the recording apparatus are stored in the memory means, and the address information for DMA transfer set by the command buffer is added every predetermined data amount (block) of the packets read out from the memory means. Thus, a burden on the host CPU is reduced.

BRIEF DESCRIPTION OF DRAWINGS

FIG. 12 is a diagram for explaining registers;

FIG. 13 is a diagram for explaining the registers; and

FIG. 14 is a diagram for explaining a medium.

BEST MODE FOR CARRYING OUT THE INVENTION

Figure 1:
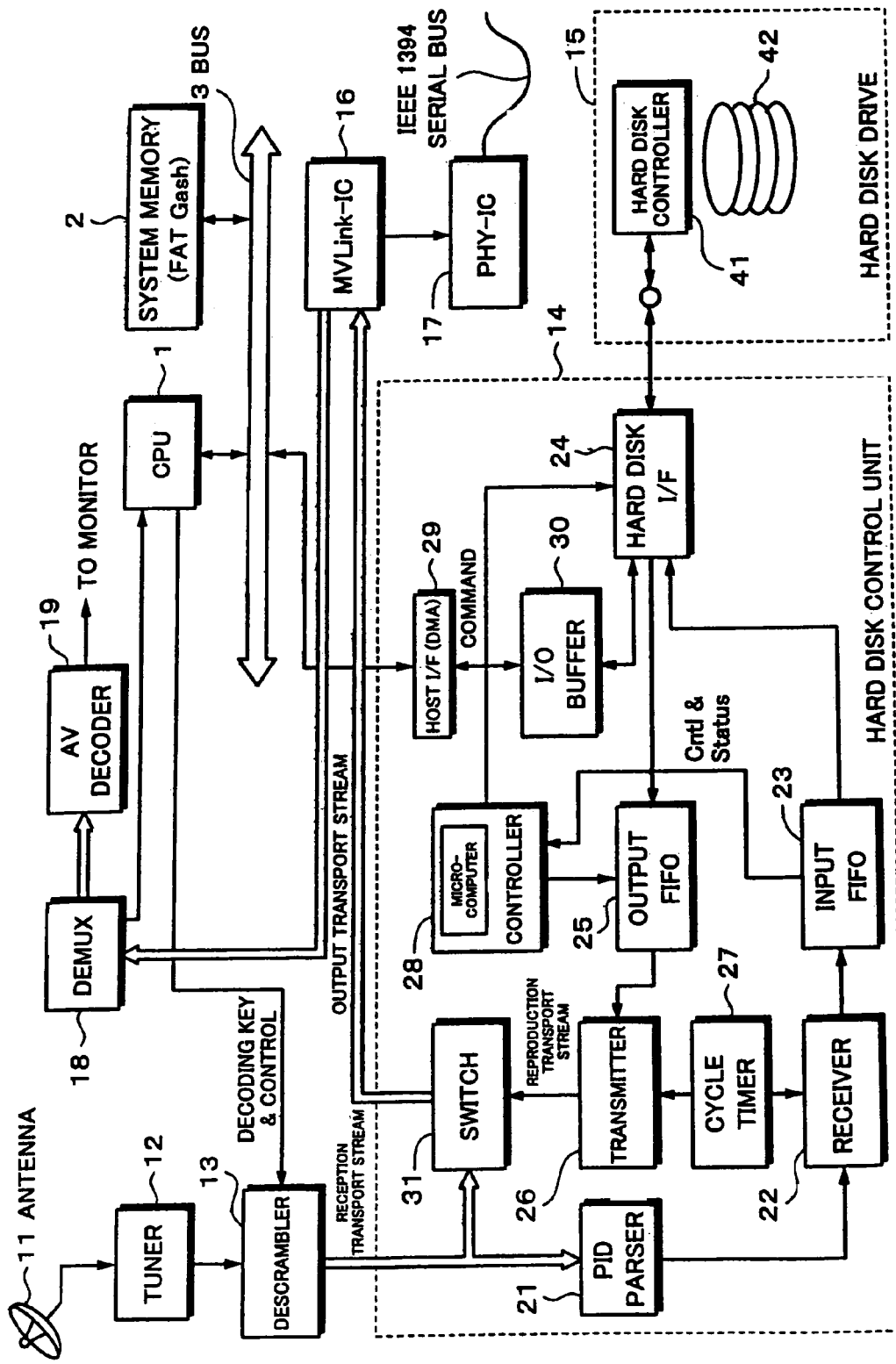
FIG. 1 is a block diagram showing an example of a construction of a digital satellite broadcast receiving apparatus having a hard disk drive therein.
Figure 2:
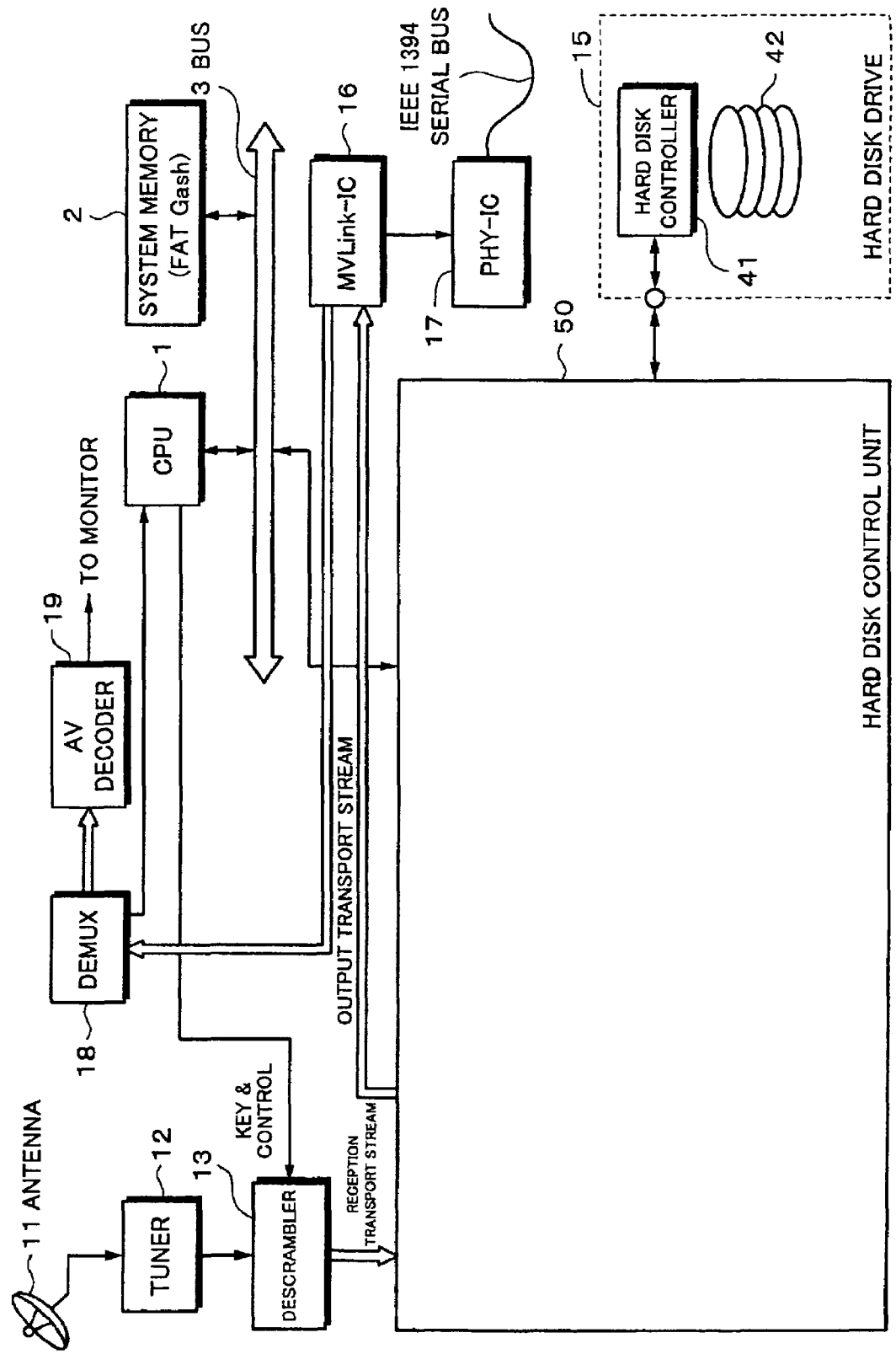
FIG. 2 is a block diagram showing an example of a construction of an embodiment of a digital satellite broadcast receiving apparatus to which the invention is applied.

FIG. 2 shows a construction of an embodiment of a digital satellite broadcast receiving apparatus to which the invention is applied. In the diagram, portions corresponding to those in FIG. 1 mentioned above are designated by the same reference numerals and their descriptions are properly omitted hereinbelow. That is, the digital satellite broadcast receiving apparatus of FIG. 2 is constructed in a manner similar to the digital satellite broadcast receiving apparatus of FIG. 1 except for a point that a hard disk control unit 50 is provided in place of the hard disk control unit 14 shown in FIG. 1.

Figure 3:
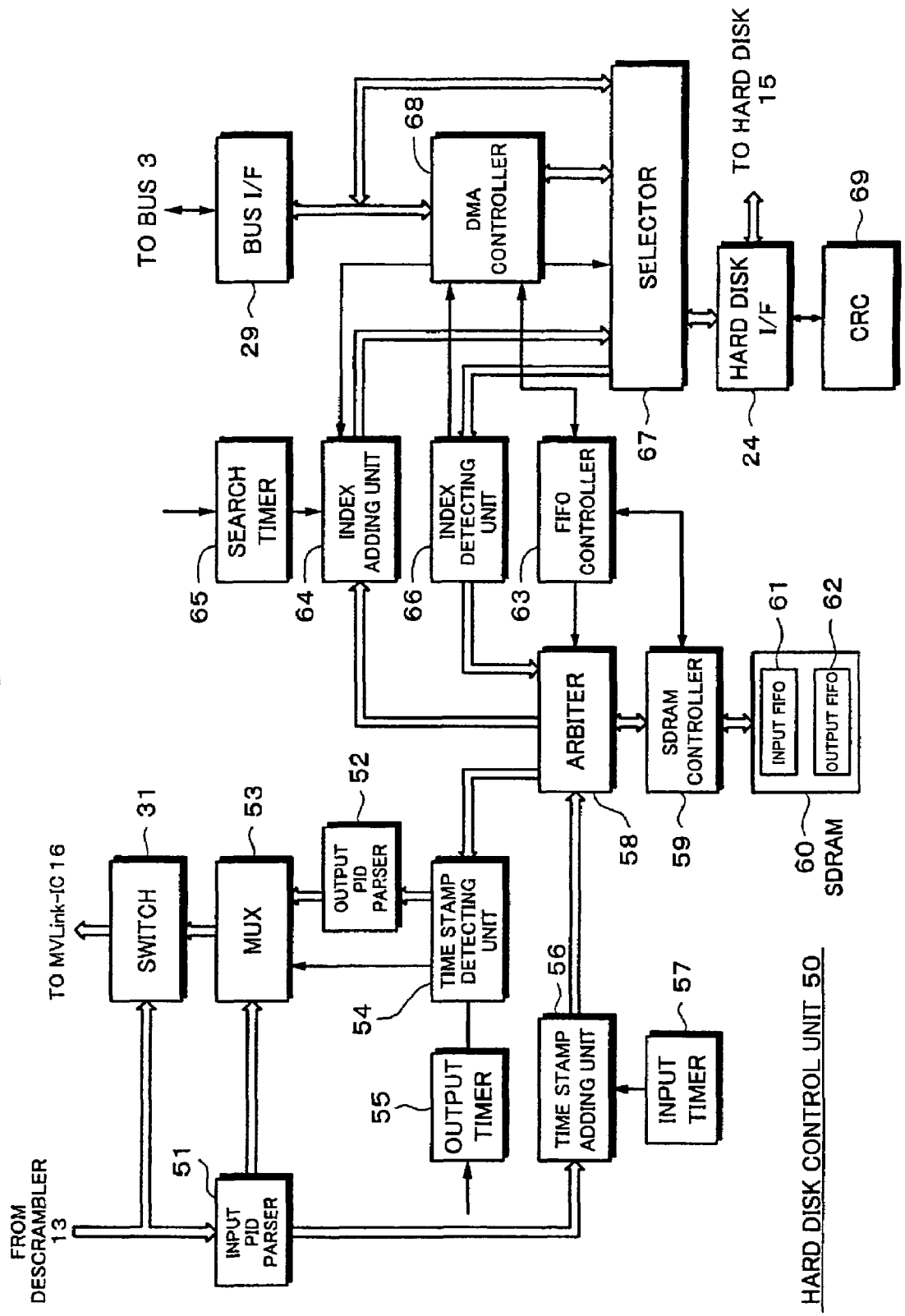
FIG. 3 is a block diagram showing an example of a construction of a hard disk control unit in FIG. 2.

FIG. 3 shows an example of a construction of the hard disk control unit 50 in FIG. 2. In the diagram, portions corresponding to those in the hard disk control unit 14 in FIG. 1 are designated by the same reference numerals and their descriptions are properly omitted hereinbelow.

The reception transport stream from the descrambler 13 is supplied to the switch 31 and an input PID parser 51. From the TS packets constructing the reception transport stream from the descrambler 13, the input PID parser 51 extracts: a TS packet to be subjected only to the recording (hereinafter, such a TS packet is properly referred to as a recording packet); a TS packet which is recorded and used for control (hereinafter, such a TS packet is properly referred to as a recording/control packet); a TS packet which is used only for control (hereinafter, such a TS packet is properly referred to as a control packet); and a TS packet to be abandoned (hereinafter, such a TS packet is properly referred to as an abandonment packet). The input PID parser 51 outputs the recording packet and the recording/control packet to time stamp adding unit 56 and outputs the control packet to an MUX 53. Further, the input PID parser 51 abandons the abandonment packet.

An output PID parser 52 receives a reproduction transport stream which is outputted from a time stamp detecting unit 54 and reproduced from the hard disk drive 15 and extracts a TS packet to be reproduced (hereinafter, such a TS packet is properly referred to as a reproducing packet) and a TS packet to be abandoned (abandonment packet) from the TS packets constructing the reproduction transport steam. Further, the output PID parser 52 outputs the reproducing TS packet to the MUX 53 and abandons the abandonment packet.

By communicating with the MUX 53, the output PID parser 52 detects the reproducing TS packet whose PID is equal to that of the TS packet that is outputted to the MUX 53 by the input PID parser 51 and changes the PID of the reproducing TS packet to a different PID. The MUX 53 multiplexes the TS packet which is outputted from the input PID parser 51 and the TS packet which is outputted from the output PID parser 52 and outputs the multiplexed packet to the switch 31.

The time stamp adding unit 56 and an input timer 57 executes processes similar to those of the cycle timer 27 and receiver 22 in FIG. 1. That is, the time stamp adding unit 56 adds time stamps based on clocks which are outputted from the input timer 57 to the inputted TS packets. The TS packets to which the time stamps were added by the time stamp adding unit 56 are inputted to an arbiter 58. The TS packets inputted to the arbiter 58 are stored into an input FIFO 61 of an SDRAM 60 under the control of an SDRAM controller 59. In response to an instruction from an FIFO controller 63, the SDRAM controller 59 controls the writing and reading operations of the packets into the input FIFO 61 and from an output FIFO 62 of the SDRAM 60.

The TS packets stored in the input FIFO 61 are read out under the control of an SDRAM controller 59 and outputted to an index adding unit 64 through the arbiter 58. The index adding unit 64 adds the LBA showing an address on the hard disk and information that is effective for another control as indices and outputs them to a selector 67. Data inputted through a bus interface 29, a command from a DMA controller 68, and the like are also inputted to the selector 67. The selector 67 selects the inputted TS packets, data, command, etc. and outputs the selected one to a predetermined apparatus. For example, the TS packets which were outputted from the index adding unit 64 and inputted to the selector 67 are outputted to the hard disk I/F 24 and, further, outputted to the hard disk drive 15 and recorded.

In case of reproducing the TS packets recorded in the hard disk drive 15 as mentioned above, in the hard disk controller 41, the reproduction transport stream as a sequence of the TS packets recorded on the hard disk 42 is read out and outputted to the hard disk control unit 50. The reproduction transport stream inputted to the hard disk control unit 50 through the hard disk I/F 24 is outputted to an index detecting unit 66 through the selector 67.

The index detecting unit 66 detects the index added by the index adding unit 64 from the inputted reproduction transport stream. The detected index is stored into a register in the DMA controller 68. On the basis of the stored index, the DMA controller 68 can also control the DMA controller 68.

The index is detected by the index detecting unit 66 and the reproduction transport stream from which the index was removed is once stored into the output FIFO 62 of the SDRAM 60 through the arbiter 58 and SDRAM controller 59. The reproduction transport stream stored in the output FIFO 62 is read out to the arbiter 58 under the control of the SDRAM controller 59 and, further, outputted to the time stamp detecting unit 54. The time stamp is detected from the reproduction transport stream inputted to the time stamp detecting unit 54 and the reproduction transport stream is outputted to the output PID parser 52 in accordance with the time stamp. Further, the processes as mentioned above are executed by the MUX 53 and switch 31, so that the resultant data is outputted to the MVLink-IC 16.

With respect to the data which is transmitted and received to/from the hard disk 15, a CRC 69 checks the data by using a CRC (Cyclic Redundancy Check).

Figure 4:
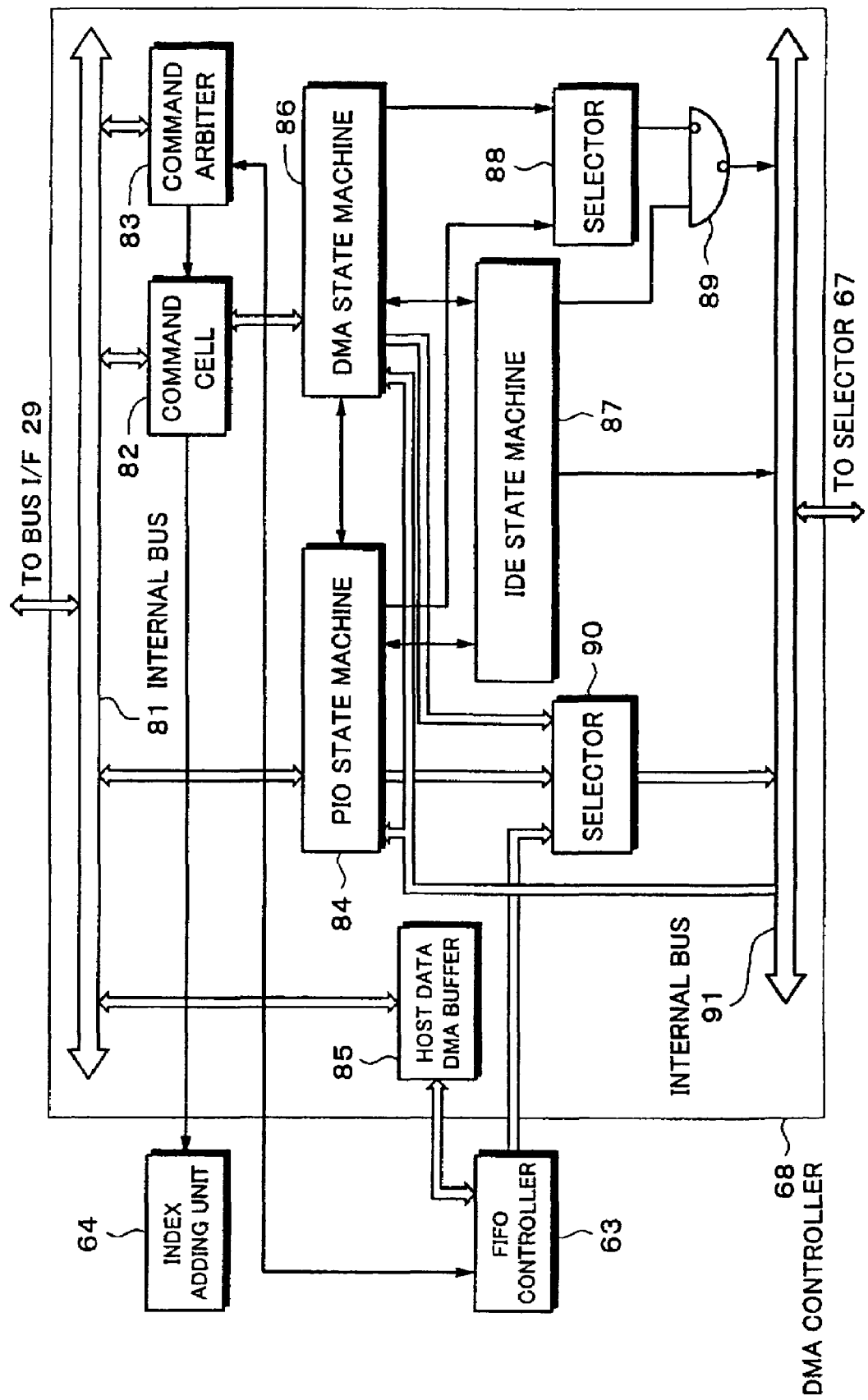
FIG. 4 is a block diagram showing a construction of a DMA controller in FIG. 3.

FIG. 4 is a diagram showing an internal construction of the DMA controller 68. An internal bus 81 in the DMA controller 68 is connected to the bus I/F 29. A command cell 82, a command arbiter 83 for controlling the command cell 82, a PIO (Programmed I/O) state machine 84 for controlling the operation at the time of transmitting and receiving the data through the CPU 1 as a host CPU, and a host data DMA buffer 85 for buffering the data at the time of the DMA transfer are connected to the internal bus 81.

A DMA state machine 86 prepares for a register and a command for executing the DMA transfer in an interlocking relational manner with the command cell 82. An IDE (Intelligent Drive Electronics) state machine 87 controls the hard disk drive 15 which is connected by an IDE drive. The PIO state machine 84, DMA state machine 86, and IDE state machine 87 are mutually connected by control lines and each state machine can perform a control according to a situation.

Signals outputted from the PIO state machine 84 and DMA state machine 86 are supplied to a selector 88 and one of those signals is supplied to an AND circuit 89. A signal from the IDE state machine 87 is also supplied to the AND circuit 89. The AND is obtained from the supplied signals and its result is outputted to an internal bus 91. The control line from the IDE state machine 87 is also connected to the internal bus 91 and a control signal of the IDE is also supplied.

Further, a signal from a selector 90 is also supplied to the internal bus 91. The selector 90 selects one of the data from the PIO state machine 84, the data from the DMA state machine 86, and the data from the FIFO controller 63 and outputs it to the internal bus 91.

Figure 5:
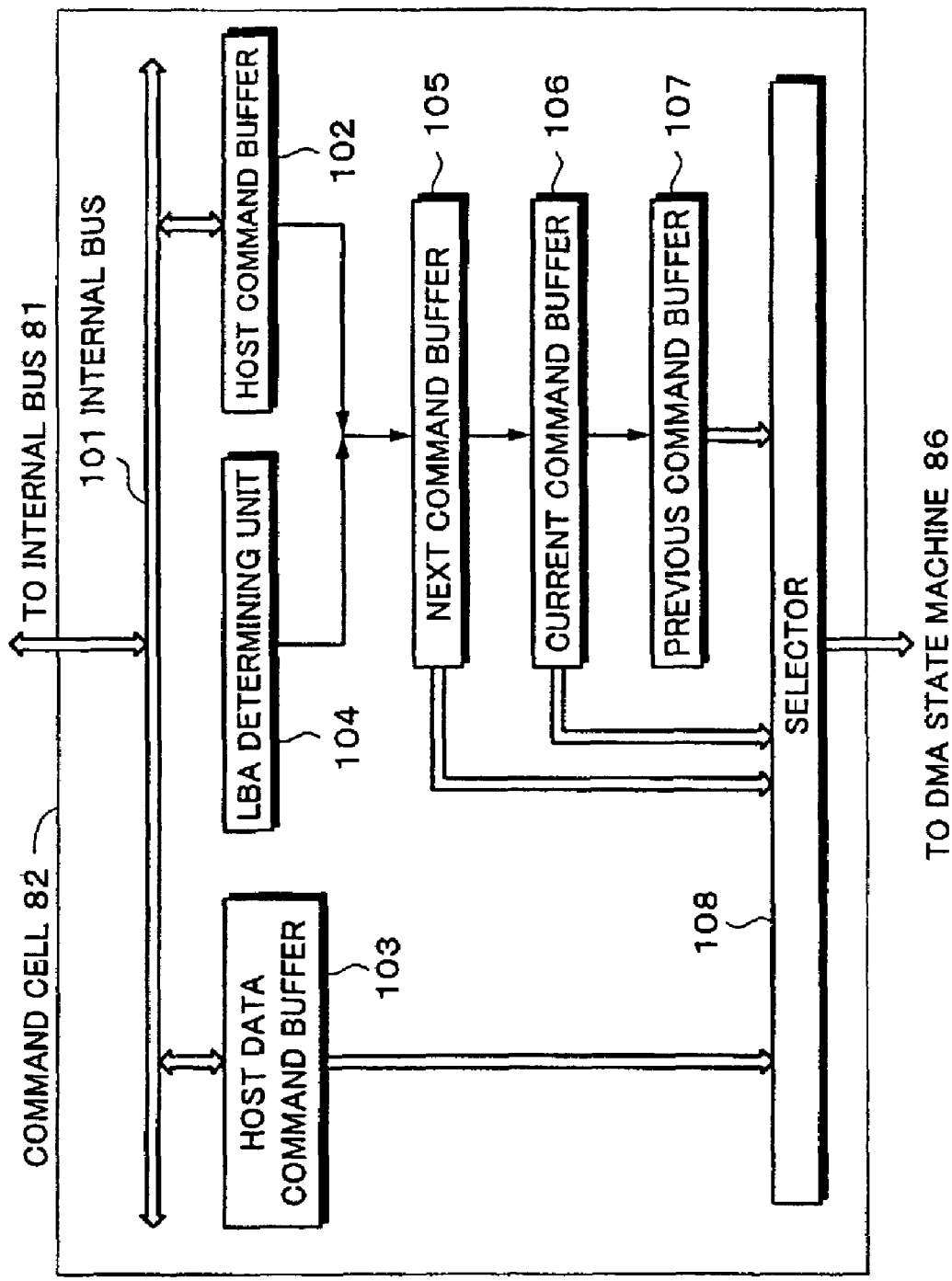
FIG. 5 is a block diagram showing a construction of a command cell in FIG. 4.

FIG. 5 is a diagram showing an internal construction of the command cell 82. A host command buffer 102 and a host data command buffer 103 are connected to an internal bus 101. Although the details will be explained hereinlater, data which is stored in a next command buffer at the post stage is formed from data which is outputted from the host command buffer 102 and an LBA determining unit 104. As for the data stored in the next command buffer 105, when new data is inputted, the stored data is outputted to a current command buffer 106 and stored. Similarly, when new data is inputted to the current command buffer 106, the stored data is outputted to a previous command buffer 107 and stored.

The command cell 82 has the host command buffer 102 for initializing the DMA transfer by the PIO access and has a role like an FIFO for shifting the contents in the command buffer each time the current DMA transfer is finished. As for each command buffer, although it is necessary to prepare a buffer for writing and a buffer for reading, only one buffer is shown in FIG. 5. By the command buffers with the FIFO-like construction, the next, current, and previous LBAs can be added as an index every cluster.

The current LBA indicates a head LBA in which the block processed at this time point is recorded. The previous LBA indicates a head LBA of the block locating just before a block N. The next LBA indicates a head LBA of the block locating just after the block N.

The data stored in the next command buffer 105, current command buffer 106, and previous command buffer 107 is supplied to a selector 108, respectively. The data from the host data command buffer 103 is also supplied to the selector 108. The selector 108 selects one of the supplied data and outputs it to the DMA state machine 86. The selected data comprises an LBA which is necessary for activating the DMA transfer of the hard disk, a sector size, and the like. The control of the hard disk can be performed by supplying those information to the DMA state machine 86 and IDE state machine 87.

Figure 6:
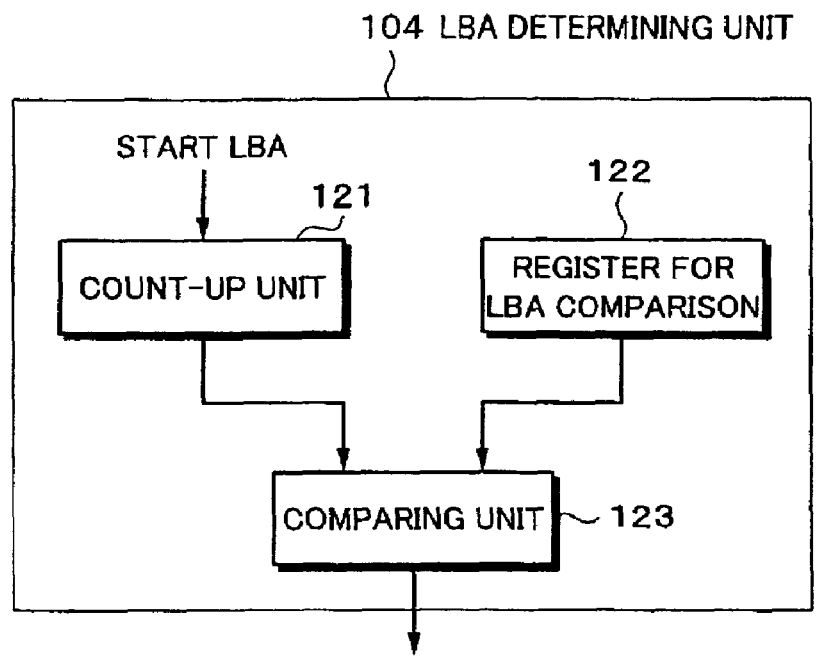
FIG. 6 is a block diagram showing a construction of an LBA determining unit in FIG. 5.

FIG. 6 is a diagram showing an internal construction of the LBA determining unit 104. The LBA determining unit 104 comprises a count-up unit 121, a register for LBA comparison 122, and a comparing unit 123.

Figure 7:
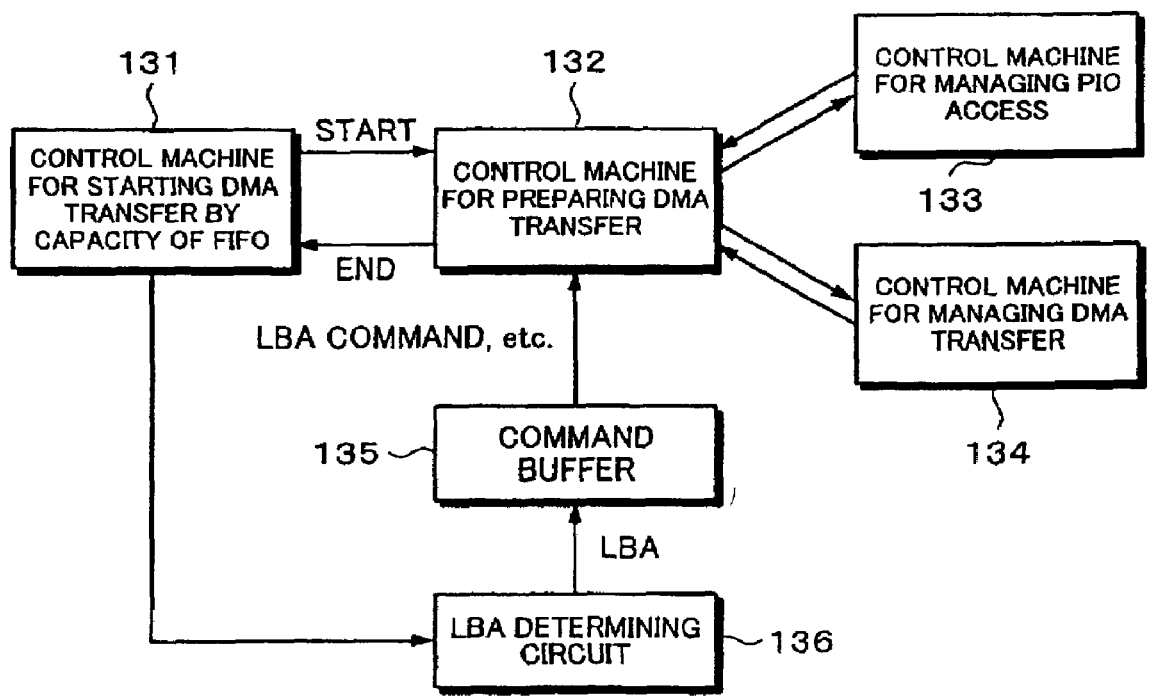
FIG. 7 is a functional block diagram of the DMA controller.

When the DMA controller 68 having the construction as mentioned above is shown by a functional block, it is as shown in FIG. 7. A control machine 131 to start the DMA transfer according to a capacity of the FIFO mainly comprises the FIFO controller 63 and command arbiter 83. A control machine 132 to prepare for the DMA transfer mainly comprises the command cell 82 and DMA state machine 86. A control machine 133 to perform the PIO access is the PIO state machine 84. A control machine 134 to perform the DMA transfer mainly comprises the IDE state machine 87. A command buffer 135 mainly comprises the command cell 82. An LBA determining circuit 136 is the LBA determining unit 104.

Figure 8:
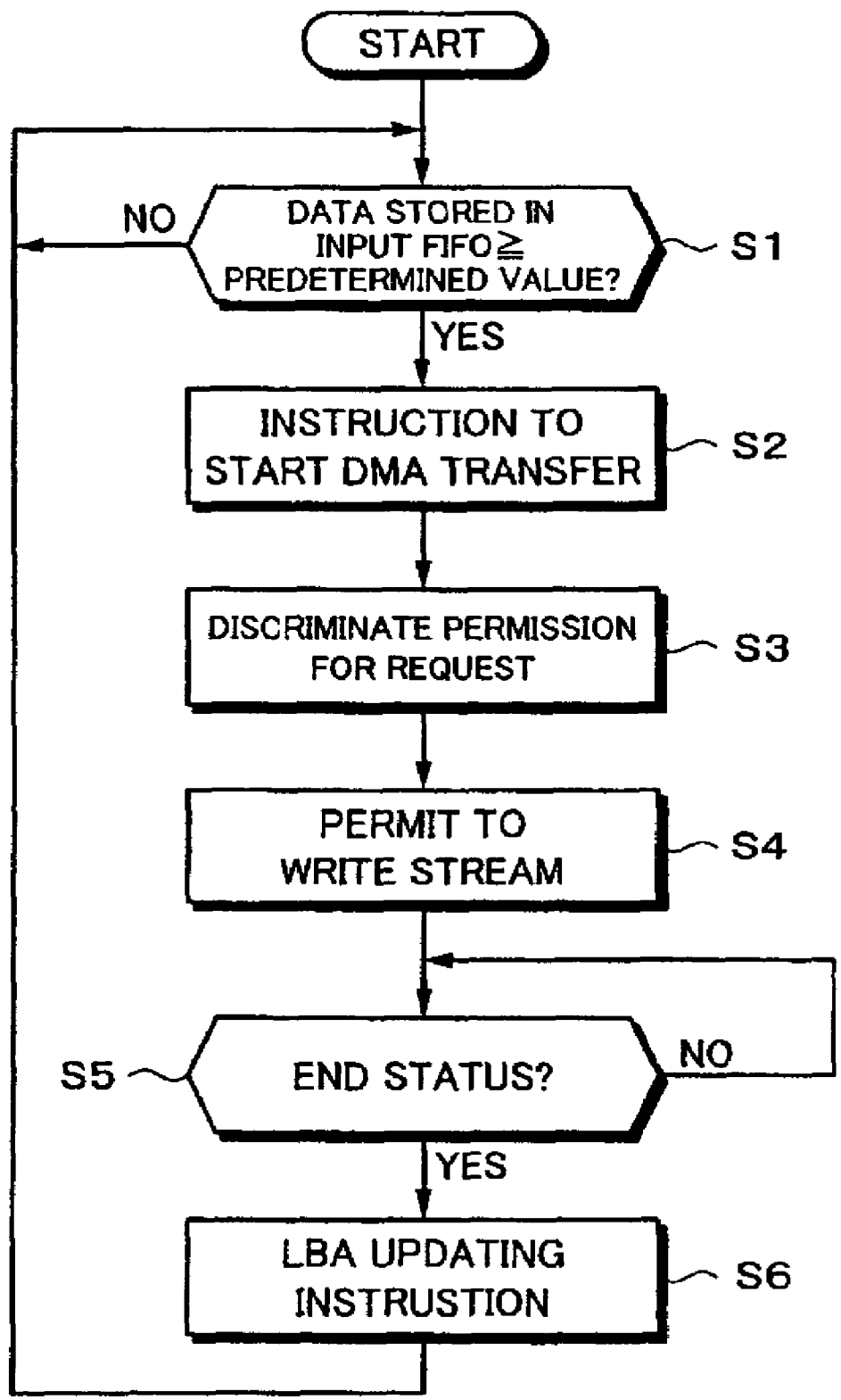
FIG. 8 is a flowchart for explaining the writing operation of the DMA controller.

Subsequently, the operation of the control machine 131 to start the DMA transfer according to the capacity of the FIFO will be described with reference to a flowchart of FIG. 8. It is assumed that the DMA transfer is executed on a 128-kbyte unit basis and the unit of 128 kbytes is defined as one cluster. Naturally, one cluster can be also defined by bytes of 128 kbytes or less.

In case of writing the received transport stream into the hard disk drive 15, in step S1, the command arbiter 83 discriminates whether the transport stream has been stored in the capacity which is equal to or larger than a predetermined value of the input FIFO 61 or not through the FIFO controller 63. The predetermined value is a capacity of, for example, 80% of that of the input FIFO 61. In step S1, whether the input FIFO is in a state where the data of the transport stream has already been written into the capacity of 80% or more or not is discriminated.

If it is determined in step S1 that the transport stream has been stored in the capacity that is equal to or larger than the predetermined capacity of the input FIFO 61, step S2 follows. In step S2, an instruction to start the DMA transfer is issued to the control machine 132 for preparing for the DMA transfer. A start LBA is supplied to the LBA determining circuit 136. Thus, the control machine 132 for preparing for the DMA transfer discriminates about which one of the three requests for the reading of the stream, the writing thereof, and the host data access the control machine 132 to prepare for the DMA transfer permits in step S3.

If the writing of the stream is permitted in step S4, step S5 follows and whether an end status has been issued or not is discriminated. The end status is issued by the control machine 132 to prepare for the DMA transfer. The process in step S5 is repeated until it is decided that the end status was issued. If it is determined that the end status was issued, step S6 follows and an instruction to update the LBA is issued to the LBA determining unit 104.

The updating of the LBA is performed by the LBA determining unit 104 (LBA determining circuit 136). When the start LBA is inputted, the count-up unit 121 starts the count-up operation. Each time the transfer of the data of one cluster is finished, the count-up unit 121 counts up and sets the LBAs of one cluster. The register 122 for LBA comparison sets flags for the LBA to be compared and the next LBA. When the flags are valid, by replacing the comparison LBA with the next LBA, the register 122 can change the value which is automatically set. By providing such a function and setting the maximum LBA of the memory area of the transport stream into the register, the LBA can be automatically returned to the start LBA of the memory capacity.

The LBA which is updated as mentioned above is supplied not only to the DMA state machine 86 but also to the index adding unit 64 and added when the transport stream as a processing target is stored into the hard disk drive 15. The processes of the flowchart shown in FIG. 8 are repetitively executed when the received transport stream is stored into the hard disk drive 15.

Figure 9:
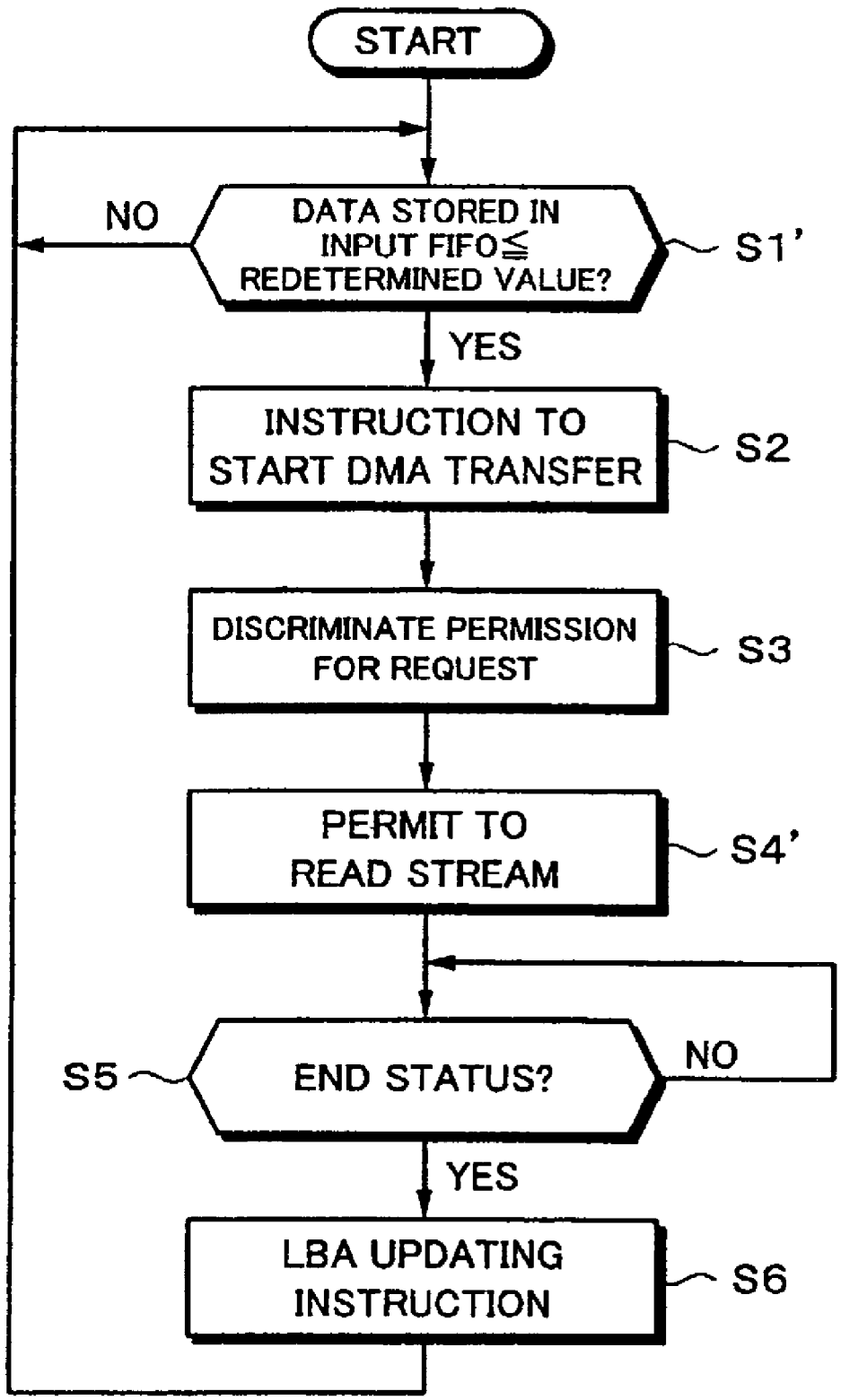
FIG. 9 is a flowchart for explaining the reading operation of the DMA controller.

FIG. 9 is a flowchart for explaining processes at the time of reading out the transport stream stored in the hard disk drive 15. Fundamentally, the processes of FIG. 9 are similar to those upon writing described with reference to the flowchart of FIG. 8 except for a point such that the write permission of the stream in step S4 in FIG. 8 is changed to step S4' as a process for read permission of the stream. Therefore, their descriptions are omitted. In the process in step S1', however, whether the data amount of the transport stream stored in the output FIFO 62 is equal to or less than, for example, 20% as a predetermined value or not is discriminated. If it is determined that it is equal to or less than the predetermined value, the processing routine advances to the processes in step S2 and subsequent steps.

The data of the transport stream which is read out from the hard disk drive 15 will now be described with reference to FIG. 10. It is also possible to use a method whereby the LBA to be read out next for predetermined data is read out from the value of the next LBA in the index information of the block which has already been read out and set. The LBA can be also set by the automatic updating of the LBA. In case of using such a method, by notifying the CPU 1 of the interruption at a point of completion of the reading of the index information, the next LBA can be dynamically changed at timing shown in FIG. 10.

Figure 10:
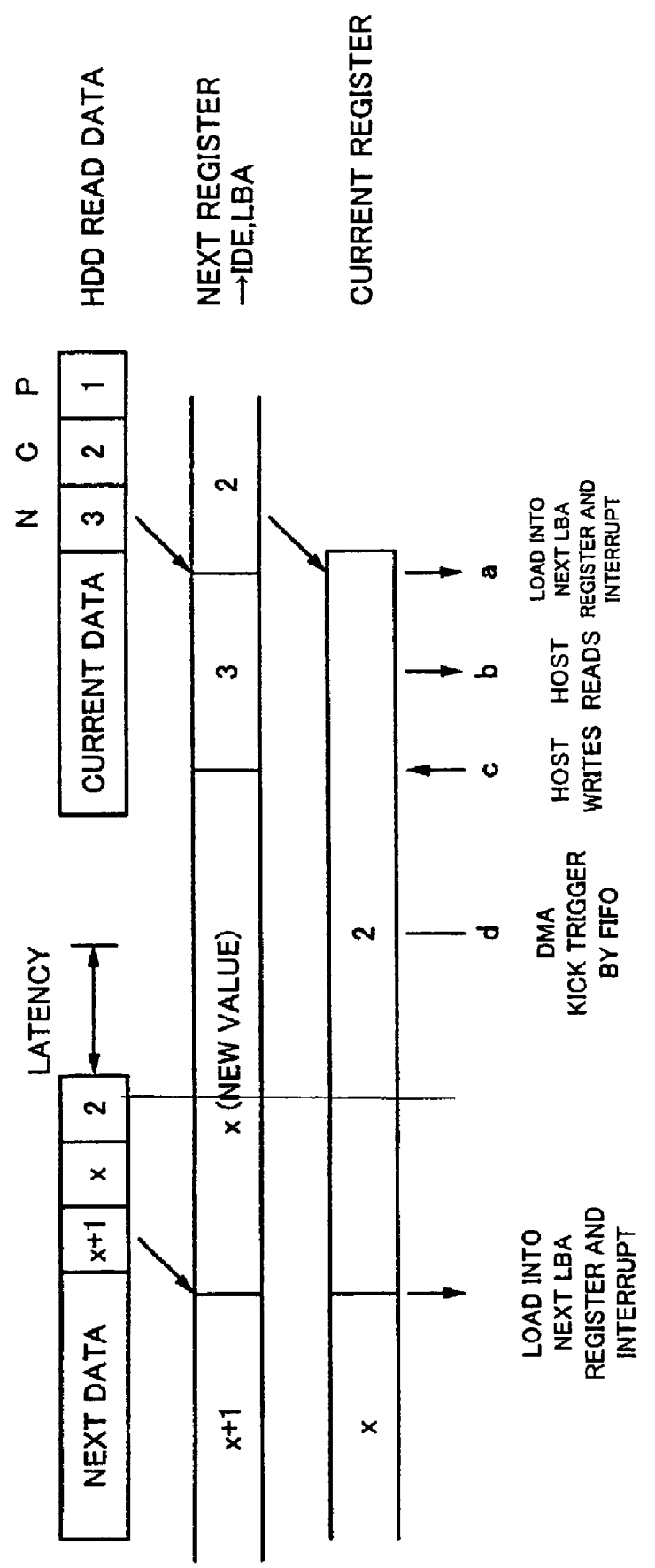
FIG. 10 is a diagram for explaining reading timing.

In FIG. 10, reference character "a" denotes timing at which an LBA link list in the index read out from the hard disk drive 15 is actually loaded into a reproduction next LBA register (not shown). By notifying the interruption at this timing, the host reads the next LBA or current LBA at timing "b". If the user wants to dynamically change the LBA of a cluster to be read out next and perform a skip reproduction, the writing is executed at timing "c". Reference character "d" denotes timing at which the DMA controller 68 automatically issues a command to the hard disk drive 15 with reference to the data which is outputted from the output FIFO 62 and indicates that almost the half of the capacity has been recorded.

The CPU 1 can also set the LBA into the DMA command buffer for writing or reading and control the DMA. In such a case, after the value is set into each command set register, by setting "1" into each command Exec bit in the control register, the command is executed. At this time, the DMA transfer to the hard disk drive 15 can be also automatically performed by a trigger of an FIFO flag by the setting irrespective of the control of the CPU 1. In such a case, when each Valid bit in the control register is equal to "1" the DMA transfer is alternately executed in accordance with the contents in the command buffer.

If the operation is finished before all of the data of one cluster is read out after the data was inputted to the output FIFO 62 due to some reason upon reproduction, by returning the current address pointer of the output FIFO 62, the data can be consequently abandoned. Thus, even if an error occurs, the operation can be recovered to a normal reproducing mode of the AV stream without passing through the CPU 1.

Figure 11:
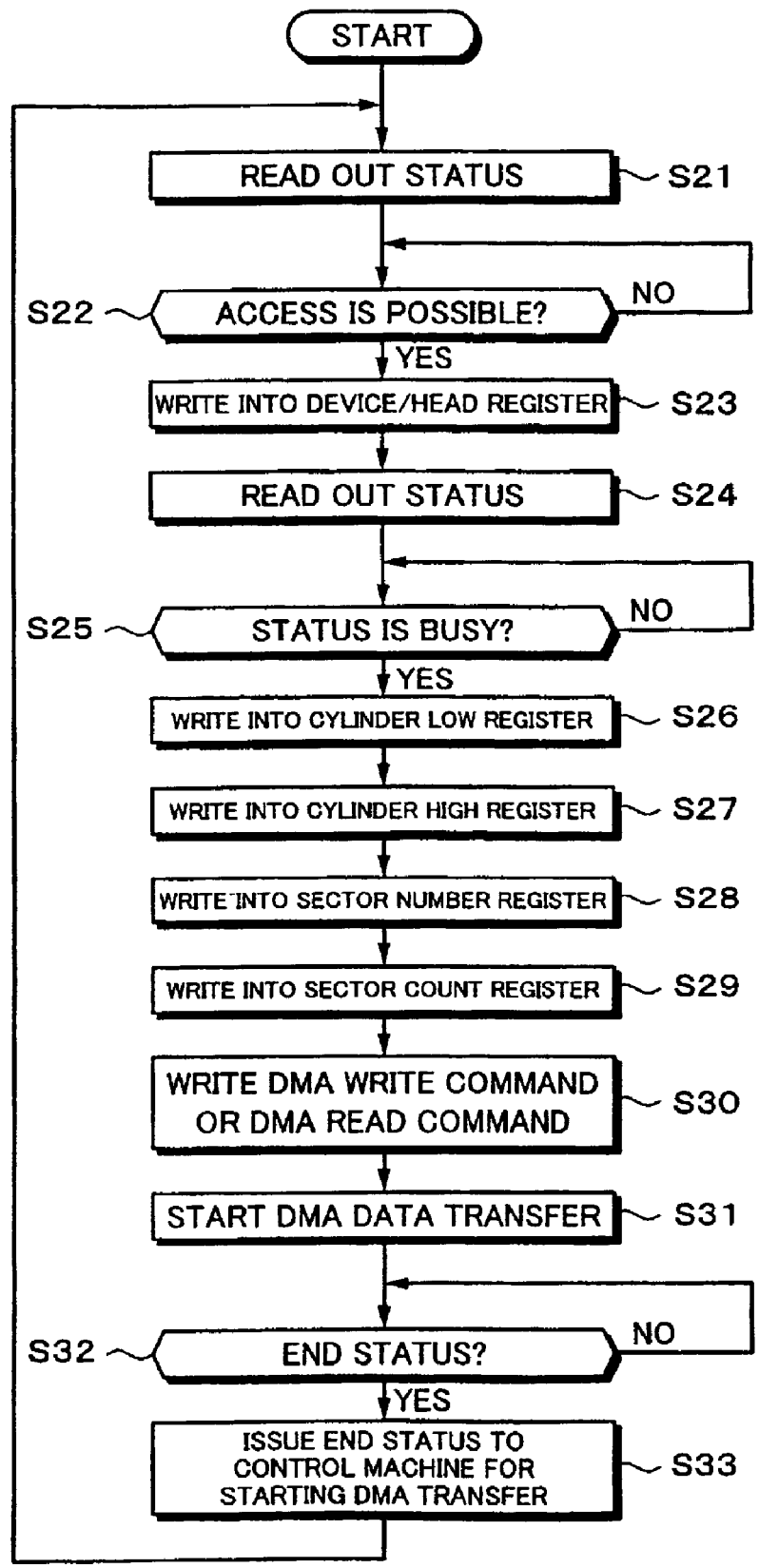
FIG. 11 is a flowchart for explaining the operation which is executed at the time of the DMA transfer of the DMA controller.

The operations of the control machine 132 for preparing for the DMA transfer and the command buffer 135 for supplying the command to the control machine 132 for preparing for the DMA transfer will now be described with reference to a flowchart of FIG. 11. In step S21, the status is read out in response to the start instruction from the control machine 131 for starting the DMA transfer according to the capacity of the FIFO. Whether the access is possible or not is discriminated in step S22 on the basis of the read-out status. The process in step S22 is repeated until it is determined that the access is possible. If it is determined that the access is possible, step S23 follows.

The data is written into device/head registers in step S23. The registers will now be described. FIG. 12A is a diagram showing the specification of registers of the IDE and showing a list of the registers. Among the control block registers in FIG. 12A, a device controller is a register as shown in FIG. 12B.

Among the command block registers in FIG. 12A, data is a register as shown in FIG. 12C and a sector number is a register as shown in FIG. 12D. Further, among the command block registers in FIG. 12A, cylinder•low and cylinder•high are registers as shown in FIG. 13A, device/head are registers as shown in FIG. 13B, sector•counter is a register as shown in FIG. 13C, and substitute status and status are registers as shown in FIG. 13D, respectively.

The registers as mentioned above exist. Among them, the data is written into the device/head registers in step S23. The status is read out in step S24. Whether a result of the read-out status indicates a busy status or not is discriminated in step S25. The process in step S25 is repeated until it is determined that the status is not the busy status. If it is decided that the status is not the busy status, step S26 follows.

The writing into the cylinder•low•register is performed in step S26. The writing into the cylinder•high•register is performed in step S27. The writing into the sector•number•register is performed in step S28. The writing into the sector count-register is performed in step S29. In the registers to which the writing has sequentially been performed as mentioned above, the data is written as a command of DMA write or DMA read in step S30.

The control machine 132 to prepare for the DMA transfer issues the DMA write or DMA read command to the control machine 134 for performing the DMA transfer in step S31 and the control machine 134 for performing the DMA transfer starts the DMA transfer in accordance with the received command. In step S32, the control machine 132 to prepare for the DMA transfer discriminates whether the status is the end status or not. If it is determined that the status is the end status, step S33 follows.

In step S33, the control machine 132 to prepare for the DMA transfer receives the end status and outputs data indicative of the end of the DMA transfer to the control machine 131 for starting the DMA transfer according to the capacity of the FIFO. The processes of the flowchart shown in FIG. 11 are repetitively executed each time the DMA transfer is started.

As mentioned above, by providing the command buffer for DMA transfer and providing the function for updating the LBA, the burden on the host CPU can be reduced. It is possible to perform the recording and reproduction without dropping out the AV stream.

Although the series of processes mentioned above can be executed by hardware, it can be also executed by software. In case of executing the series of processes by software, the program constructing the software is installed into a computer built in dedicated hardware or, for example, a general personal computer which can execute various functions by installing various programs therein, or the like from a recording medium.

As shown in FIG. 14, the recording medium is constructed by providing a drive 140 for the digital satellite broadcast receiving apparatus and by using a package media which is distributed to provide the program to the user separately from the digital satellite broadcast receiving apparatus, wherein the package media comprises: a magnetic disk 151 (including a floppy disk) in which the program has been recorded; an optical disk 152 (including a CD-ROM (Compact Disk—Read Only Memory), a DVD (Digital Versatile Disk)); a magnetooptic disk 153 (including an MD (Mini-Disc)); a semiconductor memory 154; or the like. Moreover, the recording medium can be also constructed by an ROM, the hard disk 15, or the like which is provided to the user in a state where it has previously been built in the computer and in which the program has been stored.

In the specification, the step of describing the program which is provided by the medium includes not only the processes which are time-sequentially executed in accordance with the disclosed order but also the processes which are executed in parallel or individually without being time-sequentially processed.

According to the digital broadcast receiving apparatus of the invention, when the received AV stream is DMA transferred and recorded and reproduced, the command buffer for DMA transfer is provided, the command for transfer is formed, the LBA is automatically set, and the issuance of the command, the setting of the LBA. and the setting of the transfer start timing which have conventionally been processed by the host CPU are executed on the DMA side. Thus, the burden on the host CPU can be reduced.

The invention claimed is:

1. A digital broadcast receiving apparatus communicating with a hard disk of a hard disk drive, comprising:
   receiving means for receiving a stream constructed by packets of a predetermined format under control of a central processing unit;
   extracting means for extracting packets from the packets constructing said stream received by said receiving means;
   memory means for storing said extracted packets for recording;
   memory control means for controlling writing said extracted packets into said memory means, for controlling reading of said stored packets from said memory means, for issuing a command to prepare transferring before an amount of said packets stored by said memory means reaches a full capacity, and for supplying a start address of said hard disk;

index adding means, residing outside a the central processing unit, for adding an address of a sector of minimum unit (block) of recording on said hard disk drive as an index to said packets read out by said memory control means and for outputting said packets having the added address to said hard disk;

an arbiter, external to said memory control means, for mediating said packets extracted by said extracting means for storage in said memory means, and for mediating said packets outputted from said memory means to said index adding means in response to an instruction from said memory control means;

packets transferring control means for permitting write of said packets outputted from said index adding means to said hard disk drive in accordance with said command from said memory control means, wherein said packets transferring control means includes address determining means for starting updating an address of said hard disk when said start address is inputted from said memory control means by counting up said address of said memory means each time packets of a predetermined data amount are transferred, and setting address information for the transferred packets of the predetermined data amount; and wherein the address added by said index adding means includes at least one of an address in said hard disk drive in which a just-previous block has been recorded, an address in said hard disk drive in which a current block is recorded, and an address in said hard disk drive in which a just-subsequent block is recorded; and wherein said address determining means has an internal counter for automatically setting said address information.

2. A digital broadcast receiving apparatus according to claim 1, wherein said memory means includes an input FIFO, and said transferring of said packets is made cluster by cluster, said cluster being of another predetermined data amount.

3. An information processing method comprising:

receiving a stream constructed by packets of a predetermined format under control of a central processing unit;

extracting packets from the packets constructing said received stream;

using a memory to store said extracted packets for recording;

using a memory controller to control writing of said extracted packets into said memory, to control reading of said stored packets from said memory to issue a command to prepare transferring before an amount of said packets stored by said memory reaches a full capacity, and to supply a start address of a recording device;

using an index adding unit, residing outside the central processing unit, to add an address of a sector of minimum unit of recording on a recording device drive as an index to said packets read out by said memory controller and to output said packets having the added address to said recording device;

using an arbiter, external to said memory controller, to mediate said extracted packets for storage in said memory, and to mediate said packets outputted from said memory to said index adding unit in response to an instruction from said memory controller; and using a packets transferring control means for permitting write of said packets outputted from said index adding unit to said recording device in accordance with said command from said memory controller, to permit write of said packets outputted from said index adding unit to said recording device in accordance with said command from said memory controller, wherein said packets transferring control means includes an address determining unit for starting updating an address of said recording device when said start address is inputted from said memory controller by counting up said address of said memory each time packets of a predetermined data amount are transferred, and setting address information for the transferred packets of the predetermined data amount; and wherein the address added by said index adding unit includes at least one of an address in said recording device drive in which a just-previous block has been recorded, an address in said recording device drive in which a current block is recorded, and an address in said recording device drive in which a just-subsequent block is recorded; and wherein said address determining unit has an internal counter for automatically setting said address information.

4. A recording medium in which a computer-readable program has been recorded, wherein said program, when executed, comprises the steps of:

receiving a stream constructed by packets of a predetermined format under control of a central processing unit;

extracting packets frfrom the packets constructing said received stream;

using a memory to store said extracted packets for recording;

using a memory controller to control writing of said extracted packets into said memory, to control reading of said stored packets from said memory, to issue a command to prepare transferring before an amount of said packets stored by said memory reaches a full capacity, and to supply a start address of a recording device;

using an index adding unit residing outside the central processing unit, to add an address of a sector of minimum unit of recording on a recording device drive as an index to said packets read out by said memory controller and to output said packets having the added address to said recording device;

using an arbiter, external to said memory controller, to mediate said extracted packets for storage in said memory, and to mediate said packets outputted from said memory to said index adding unit in response to an instruction from said memory controller; and using a packets transferring control means for permitting write of said packets outputted from said index adding unit to said recording device in accordance with said command from said memory controller, to permit write of said packets outputted from said index adding unit to said recording device in accordance with said command from said memory controller, wherein said packets transferring control means includes an address determining unit for starting updating an address of said recording device when said start address is inputted from said memory controller by counting up said address of said memory each time packets of a predetermined data amount are transferred, and setting addr information for the transferred packets of the predetermined data amount; and wherein the address added by said index adding unit includes at least one of an address in said recording device drive in which a just-previous block has been recorded, an address in said recording device drive in which a current block is recorded, and an address in said recording device drive in which a just-subsequent block is recorded; and wherein said address determining unit has an internal counter for automatically setting said address information.

5. A digital broadcasting receiving apparatus according to claim 2, wherein said input FIFO sequentially stores said extracted packets for recording and outputs said stored packets in storing order.

6. An information processing method according to claim 3, wherein storing said extracted packets for recording includes storing said extracted packets into an input FIFO, and said transfetting of said packets is made cluster by cluster, said cluster being of another predetermined data amount.

7. An information processing apparatus method according to claim 6, wherein said input FIFO sequentially stores said extracted packets for recording and outputs said stored packets in storing order.

8. An recording medium in which a computer-program readable program has been recorded according to claim 4, wherein storing said extracted packeets for recording includes storing said extracted packets in to an input FIFO, and said transferring of said packets is made cluster by cluster, said cluster being of another predetermined data amount.

9. A recording medium in which a computer-program readable program has been recorded according to claim 8, wherein said input ETFO sequentially stores said extracted packets for recording and outputs said stored packets in storing order.

10. A digital broadcasting receiving apparatus according to claim 1, wherein said packets ransferring control means further includes a reister for memory address compaison, wherein a maximu address of the memory means may be set in said register, and wherein the memory address may be automatically returned to the start address after counting-up to the maximum address.

* * * * *

UNITED STATES PATENT AND TRADEMARK OFFICE
CERTIFICATE OF CORRECTION

PATENT NO. : 7,565,460 B2
APPLICATION NO. : 09/913688
DATED : July 21, 2009
INVENTOR(S) : Takeo Morinaga It is certified that error appears in the above-identified patent and that said Letters Patent is hereby corrected as shown below:

Column 13, line 4, after "outside" delete "a".
Column 13, line 53, after "memory" insert --,--.
Column 14, line 30, "frfrom" should read --from--.
Column 14, line 63, "addr" should read --address--.
Column 15, line 17, "transfetting" should read --transferring--.
Column 15, line 20, after "processing" delete "apparatus".
Column 16, line 1, "An" should read --A--.
Column 16, line 4, "packeets" should read --packets--.
Column 16, line 5, "in to" should read --into--.
Column 16, line 12, "ETFO" should read --FIFO--.
Column 16, line 16, "ransferring" should read --transferring--.
Column 16, line 17, "reister" should read --register--.
Column 16, line 17, "compaison" should read --comparison--.
Column 16, line 18, "maximu" should read --maximum--.

Signed and Sealed this

Seventeenth Day of August, 2010

David J. Kappos
*Director of the United States Patent and Trademark Office*